United States Patent [19]

Dimpfl

[11] 4,397,823
[45] Aug. 9, 1983

[54] PROCESS AND APPARATUS FOR REMOVING A POLLUTANT FROM A GAS STREAM

[75] Inventor: William L. Dimpfl, Oakland, Calif.

[73] Assignee: Chevron Research Company, San Francisco, Calif.

[21] Appl. No.: 343,988

[22] Filed: Jan. 29, 1982

[51] Int. Cl.³ .............. B01J 8/00; B20C 19/00; B01J 1/10; B01J 1/12

[52] U.S. Cl. ................ 423/210; 204/157.1 R; 422/186; 241/1; 423/215.5

[58] Field of Search ............ 423/210 C, 215.5; 422/22, 23, 186; 241/1; 204/157.1 L, 158 L, 157.1 P

[56] References Cited

U.S. PATENT DOCUMENTS

| 3,977,952 | 8/1976 | Knoevenagel et al. | 204/157.1 R |
| 4,082,633 | 4/1978 | Eerkens | 422/186 |
| 4,097,349 | 6/1978 | Zenty | 204/158 R |
| 4,226,369 | 10/1980 | Botts et al. | 241/1 |
| 4,276,463 | 6/1981 | Kime | 241/1 |

OTHER PUBLICATIONS

*Lasers in Industry*, Von Nostrand Rheinhold Co., p. 312 (1972).

Primary Examiner—O. R. Vertiz
Assistant Examiner—Steven Capella
Attorney, Agent, or Firm—Burns, Doane, Swecker & Mathis

[57] ABSTRACT

Carbonaceous particles are removed from an exhaust gas stream by passing the stream through a frustoconically shaped bleaching zone into which a similarly shaped diverging beam of laser radiation that is absorbed selectively by the particles is directed countercurrent to the stream. The radiation is reflected within the zone to increase the radiation density in the zone over that generated by the laser directly.

7 Claims, 1 Drawing Figure

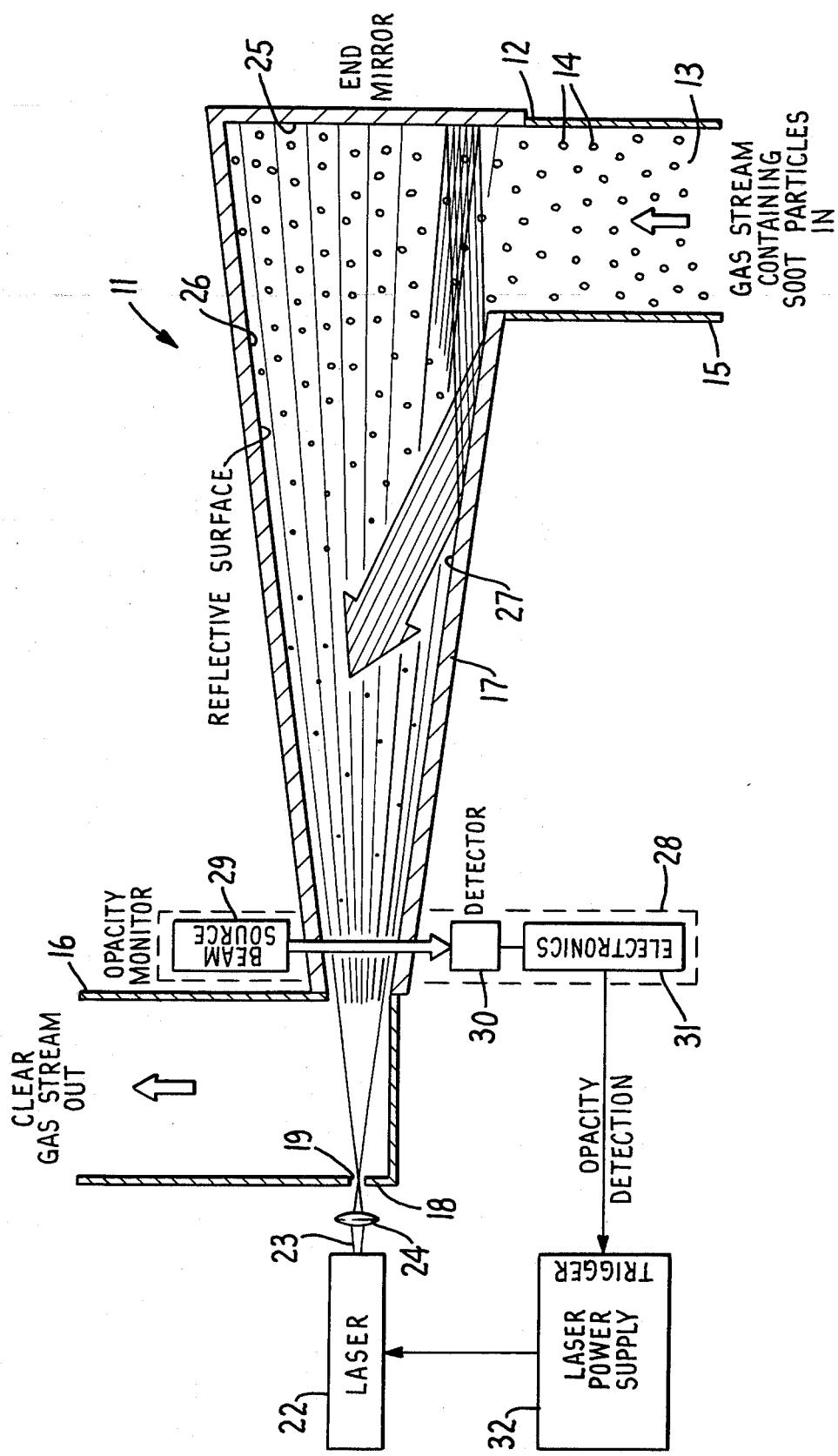

PROCESS AND APPARATUS FOR REMOVING A POLLUTANT FROM A GAS STREAM

BACKGROUND OF THE INVENTION

1. Field of the Invention

The invention relates to a process and apparatus for removing pollutants, such as carbonaceous materials, from gas streams, such as combustion exhaust streams, in which the stream is exposed to a laser beam having a frequency that is absorbed selectively by the pollutant.

2. Description of the Prior Art

U.S. Pat. Nos. 3,977,952 and 4,097,349 describe processes for removing contaminants or pollutants from combustion gases that involve exposing the gas to electromagnetic radiation. In the process of U.S. Pat. No. 3,977,952, oxygen and water containing a small amount of HCl are added to the gas and the mixture is exposed to light having a wave length of 20 to 600 nm. Photoinduced reactions occur that convert the carbon, nitrogen, and sulfur to gases that are allowed to escape from the aqueous phase.

U.S. Pat. No. 4,097,349 teaches a process for removing sulfur dioxide and nitrogen-oxygen compounds from combustion gases by a photochemical reaction of such materials with a reactive hydrocarbon. Specifically, oxygen and an olefinic hydrocarbon are added to the combustion gas and the mixture is irradiated with electromagnetic radiation having a wavelength of 1500 A° to 7500 A°. The radiation excites the sulfur dioxide and causes free radical formation, thereby promoting conversion of the reactants into a particulate material that is removed by conventional separation techniques.

High energy laser beams have been used to fix nitrogen. U.S. Pat. No. 4,167,463 teaches a nitrogen fixation process in which air and nitrogen are charged under pressure into a chamber having a window. A high energy laser beam is passed through the window into the chamber thereby heating the mixture to create a plasma in which nitric oxide is formed. The plasma is quenched rapidly to prevent decomposition of the nitric oxide to nitrogen and oxygen and the nitric oxide is removed from the quenched gas by scrubbing with water.

U.S. Pat. No. 4,226,369 describes laser treatment of coal combustion gas to destroy particles above 2-5 microns to make the gas suitable for driving turbines. The treatment apparatus includes a chamber with intake and exhaust outlets for the gas. A plurality of lasers flank opposite sides of the chamber. The beams from the laser are directed into the chamber through windows in the chamber sides at a slight (1° to 2°) angle to the gas flow to form a Chevron pattern of illumination.

Lasers have also been used in photolytic processes. In such processes, molecules are excited by laser irradiation and dissipate their energy by tearing apart. *Lasers in Industry*, Von Nostrand Rheinhold Co., p. 312 (1972) suggests that laser-induced photolysis could be used to reduce the emission of gaseous pollutants from industrial stacks. An indicated drawback in such treatment of stack gases is that a high energy laser that emits UV radiation is required to effect photolysis of the common pollutants.

Ubhayaker and Williams, J Electrochem Soc, 123, 747 (1976) studied the sustained combustion of laser ignited carbon particles in quiescent $N_2$-$O_2$ mixtures in test vessels. The reported tests indicate that particles greater than about $50\mu$ could not sustain combustion after the ignition laser pulse.

SUMMARY OF THE INVENTION

The invention process for removing a pollutant from a gas stream comprises exposing the stream to laser radiation that is directed substantially countercurrent to the flow of the gas stream and has a frequency that is absorbed selectively by the pollutant for a time sufficient to effect substantially complete thermally induced degradation of the pollutant. As used herein, the term "thermally induced degradation" includes all kinds of decomposition effected by heat such as burning (oxidation) and pyrolysis.

The invention apparatus comprises:
(a) a conduit for carrying the gas stream, the conduit including a laser bleaching zone having a generally frustoconical shape and being positioned such that the gas stream flows from the base to the apex of the zone;
(b) a laser that emits radiation that is absorbed selectively by the pollutant;
(c) lens means through which the laser radiation is passed for forming it into a diverging beam that conforms generally to the shape of the bleaching zone and directing the diverging beam into the zone countercurrent to the flow of the gas stream; and
(d) reflecting means for reflecting the laser radiation directed into the zone whereby the radiation density in the zone is increased over that generated directly by the laser.

BRIEF DESCRIPTION OF THE DRAWINGS

The drawing, which is not to scale, shows a partly schematic sectional view of an embodiment for carrying out the invention.

DETAILED DESCRIPTION OF THE INVENTION

The invention process may be used to remove particulate or gaseous pollutants from gas streams. It is especially useful for removing particulate pollutants such as uncombusted fuel, soot, and ash from gases evolved by burning carbonaceous fuels such as oil, coal, and wood in furnaces, power plants, and internal combustion engines. This technique for eliminating such pollutants is sometimes referred to herein as "laser bleaching".

As a particle's temperature rises, its decrease in size is first-controlled by its kinetic burning rate, next by the rate of diffusion of oxygen to its surface, and finally by the rate of arrival of the necessary energy for vaporization. The Ubhayaker and Williams study, supra, indicates that carbon particles will quench when their diameter is well in excess of about $50\mu$. Therefore, it is not possible to achieve substantially complete burnout of carbonaceous particulate pollutants by merely igniting them with a laser. Complete burnout can only be achieved through prolonged exposure to the radiation. Such exposure is preferably accomplished using pulsed laser output rather than continuous laser output. In this regard many considerations favor using pulsed laser output (eg laser efficiency, higher power density, and control through repetition rate.) If the particle is large (>1 mm equivalent spherical diameter), its temperature in a radiation field is determined largely by the balance of radiation and is a function principally of the radiation intensity. If the particle is smaller than about one mm in equivalent spherical diameter, heat losses through conduction become significant and a particle whose burning is sustained by a radiation field can eventually reach a size where conduction will quench the burning.

FIG. 1 illustrates an apparatus, generally designated 11, that uses pulsed laser output as well as several other highly desirable features to bleach an exhaust flue gas effectively and efficiently. The apparatus includes a conduit 12, only a portion of which is shown, that is connected at one end to the exhaust gas source (not shown) and vented at its other end to the atmosphere. A stream of exhaust gas 13 laden with carbonaceous particles 14 is carried through the conduit from the source to the atmosphere. The direction of flow of the gas is indicated by the arrows in FIG. 1.

The portion of the conduit shown in FIG. 1 is composed of three successive interconnected segments: an inlet segment 15; and outlet or exhaust segment 16; and a bleaching zone segment 17 that is between the inlet and outlet segments. The inlet segment opens at a right angle into the bleaching zone and the bleaching zone opens at a right angle into the outlet segment. The elbow 18 that defines the transition between the bleaching zone and the outlet zone has a small window 19 in its one side that faces into the flow of the exhaust gas stream. The window is made from a material that is transparent to but not affected adversely by laser radiation. A laser 22 is located exterior to the window with its usable output radiation, represented by beam 23, directed into the window. Before the beam reaches the window it is passed through a lens system, generally designated 24, that causes the beam to diverge into a cone of predetermined dimensions. As shown in the drawing the beam dimensions generally conform to the dimensions of the bleaching zone which also has a frustoconical shape. Thus the beam initially passes through the bleaching zone generally countercurrent to the flow of gas through the zone. The interior end and side surfaces 25, 26, and 27, respectively, of the portion of the conduit that defines the bleaching zone are reflective so that the radiation is trapped and reflected in the zone. Radiation reflected from the surface concentrates near the apex of the zone which serves to minimize radiation losses at the entrance to the exhaust segment and maximize the radiation in the zone at a position just downstream of that entrance. Having the radiation intensity greatest at that position gives maximum bleaching efficiency.

An opacity (pollutant concentration) monitoring system, designated 28, located at the exhaust end of the bleaching zone is an efficient means of operating the laser in an intermittent mode (as used herein "intermittent" is intended to mean on-off sequences correlated to the pollutant concentration in the stream rather than regular pulsed output). This monitoring system includes a light beam source 29 located on one side of the zone that projects a beam of light across the exhaust end of the bleaching zone to the other side. A light beam detector 30 is located on the other side of the zone to receive any light passing through the zone. The detector is connected to appropriate electronics 31 that convert light signals received by the detector into an electrical signal. Signals of predetermined intensity are transmitted to a laser power supply 32 and cause the laser to be activated. The resulting shot of continuous radiation or radiation pulses from the laser burns carbonaceous particles present in the bleaching zone to some distance into the zone from the exhaust end thereof. The opacity monitor senses when a new "front" of particles is nearing the entrance to the exhaust segment and triggers the next shot of radiation from the laser. In this way, substantially no particles emerge from the bleaching zone into the exhaust segment and the laser repetition rate is limited to that which is just necessary to remove the particles from the gas stream. A similar technique could be used to limit the maximum exhaust opacity by adjusting the opacity monitoring system to trigger the laser at that limit.

The radiation emitted by the laser should be absorbed selectively by the pollutant. In this regard the term "selectively" means that the radiation is absorbed by the pollutant, but is not absorbed to any substantial extent by the other components of the gas stream, including the products from the degradation of the pollutant. The radiation wavelengths that are absorbed selectively by particulate carbonaceous particles in exhaust gases exist in the gaps between the strong absorptions of the gas and vapor components of the stream. These gaps are approximately 400 to 1300 nm, 1500 to 1750 nm, 2000 to 2400 nm, 3500 to 4200 nm and 8500 to 11500 nm. The largest absorptions between these gaps come from carbon dioxide and water.

The power density required to remove particles, as implied earlier, is not defined by a simple relationship. Based on the theoretical considerations mentioned above it is estimated that power densities in the range of about $10^4$ to $10^5$ watts/cm$^2$ are required to burn soot particles from an initial equivalent spherical diameter of 100 microns down to a diameter of less than one micron. Such diameter reduction is an indicia of substantially complete thermal degradation of the pollutant.

Pulsed lasers capable of delivering powers high enough for soot bleaching are $CO_2$ gas, Nd/glass, Nd/YAG, and ruby lasers, oscillating at 10.6, 1.06, 1.06, and 0.694$\mu$; respectively. None of these wavelengths is absorbed strongly by the inert components of flue gas. Generally laser efficiency is greater the longer the wavelength of the fundamental output; indicating the $CO_2$ gas laser, oscillating at 10.6$\mu$, as the best choice for removing soot. In general the shortest possible pulse is the best. High power $CO_2$ lasers can give pulses around one $\mu$ sec in duration.

Modifications of the device and techniques described above that are obvious to those of ordinary skill in the laser art, the mechanical arts, the air pollution control art, or other arts related to the invention are intended to be within the scope of the following claims.

I claim:

1. A process for removing a pollutant from a gas stream comprising exposing the stream to laser radiation that is directed substantially countercurrent to the flow of the gas stream and has a wavelength that is absorbed selectively by the pollutant for a time sufficient to effect substantially complete thermal degradation of the pollutant, the exposure occuring in a zone having a frustoconical shape, the gas stream passing in the direction from the base to the apex of the zone and the laser radiation being admitted into the zone at the apex thereof in a conically shaped beam that generally conforms to the dimensions and shape of the zone.

2. The process of claim 1 wherein the pollutant is carbonaceous particles having equivalent spherical diameters greater than about 50 microns and the frequency is in at least one of the following ranges: about 400 to about 1300 nm, about 1500 to about 1750 nm, about 2000 to about 2400 n, about 3500 to about 4200 nm, and about 8500 to about 1150 nm.

3. The process of claim 2 wherein the time is at least sufficient to reduce the equivalent spherical diameter of the particles to below about one micron.

4. The process of claim 1 wherein the radiation is reflected to increase the radiation density over that generated directly from the laser and concentrates near the apex of the zone.

5. The process of claim 1 wherein the exposure is intermittent and the intermittency is regulated by the pollutant concentration in the stream.

6. The process of claim 1 wherein the exposure occurs in a zone, is intermittent, and its intermittency is regulated by the pollutant concentration in the stream at or near the stream exit from the zone.

7. The process of claim 1, 2, 3, 4, or 6, wherein the radiation is pulsed.

* * * * *